W. A. SO RELLE.
CHANGE SPEED GEARING.
APPLICATION FILED JULY 9, 1913.
1,113,704.
Patented Oct. 13, 1914.
2 SHEETS—SHEET 2.
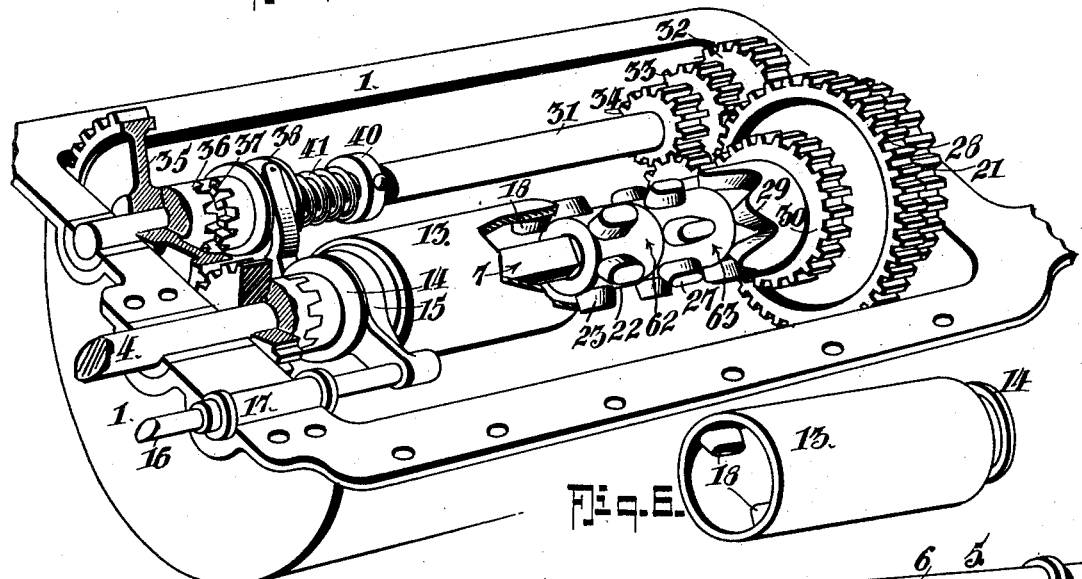
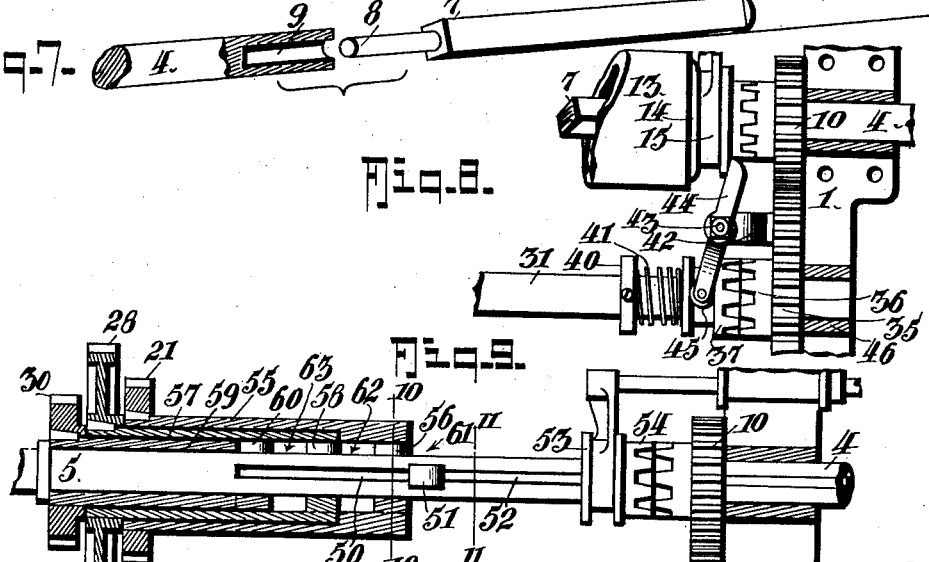
WITNESSES:
John J. Schrott
Charles J. Diller
INVENTOR
William A. SoRelle
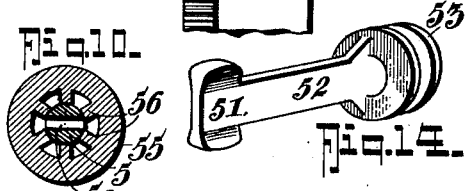
BY
Fred J. Dieterich
ATTORNEYS

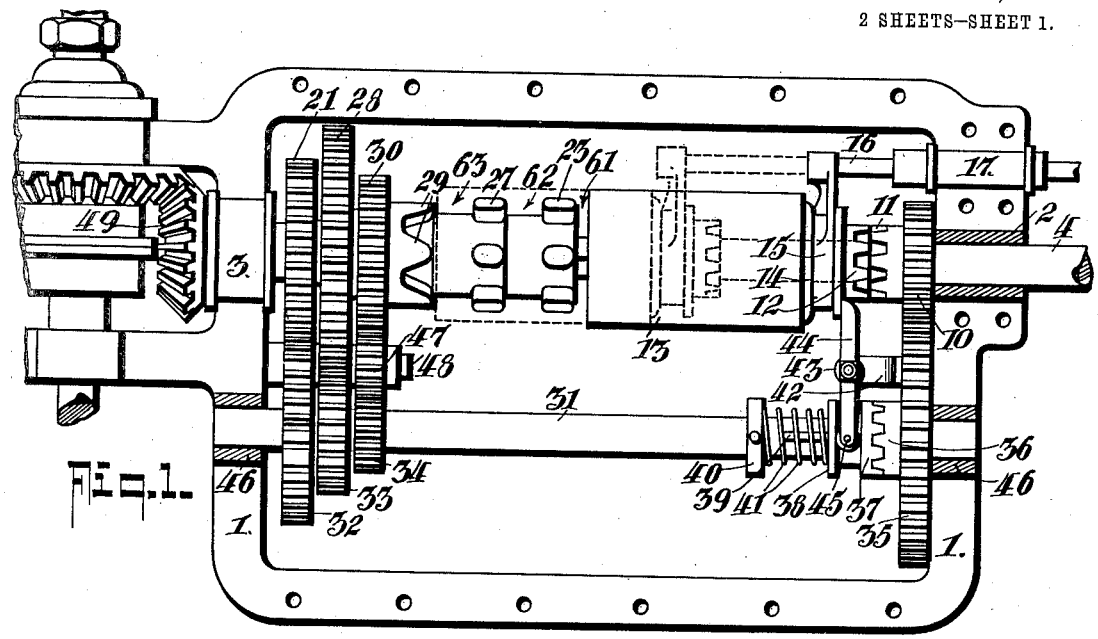
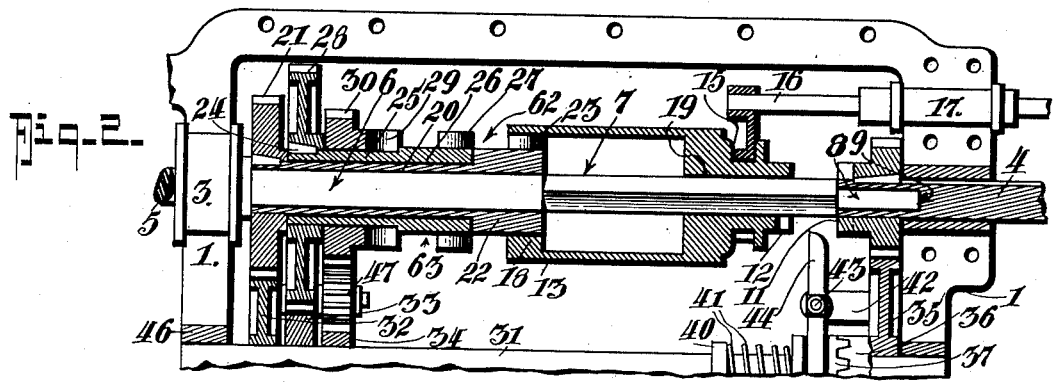
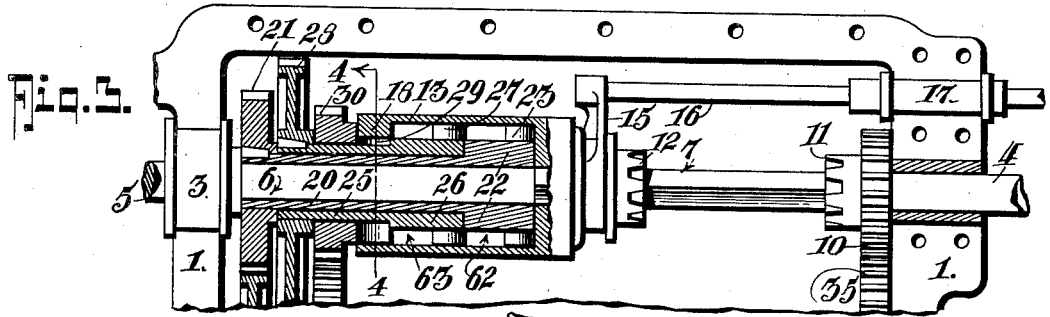

UNITED STATES PATENT OFFICE.

WILLIAM A. SO RELLE, OF CLARENDON, TEXAS.

CHANGE-SPEED GEARING.

1,113,704.  Specification of Letters Patent.  Patented Oct. 13, 1914.

Application filed July 9, 1913. Serial No. 778,202.

*To all whom it may concern:*

Be it known that I, WILLIAM A. SO RELLE, residing at Clarendon, in the county of Donley and State of Texas, have invented certain new and useful Improvements in Change-Speed Gearing, of which the following is a specification.

My invention relates to the art of power transmission for automobiles and the like, in which the driving element is coupled with the driven element by a transmission gearing of the selective type, the mechanism being so arranged that the driven element may be made to turn at the same rate of speed as the driving element or at lesser rate of speed in the same direction as the driving element, or the driven element may be made to turn in an opposite direction to the driving element.

In its generic nature, the invention provides a driving shaft and a driven shaft arranged in alinement, and a countershaft which parallels the driving and driven shafts and carries a set of gears that continuously mesh with gears on the driven and driving shafts, the gears on the driven shaft running loose and one of the gears on the counter shaft being adapted to run loose thereon during the time the driving and driven shafts are directly connected for high speed purposes.

The invention also includes a sliding member that is adapted to engage parts of the sleeves that carry the respective driven shaft gears, there being positively designed "neutral" places between each gear changing position, and there being provided means for disconnecting the reverse, the low and the intermediate gears and the counter shaft when the direct drive is in action so that waste of power through friction and the operation of unnecessary parts, is avoided. The gearing is inclosed in a housing which acts as a lubricant reservoir so that the gears may run in grease or oil.

More subordinately the invention includes those novel details of construction, combination and arrangement of parts, all of which will be first fully described, and then be specifically pointed out in the appended claim, reference being had to the accompanying drawings, in which:—

Figure 1 is a top plan view (the housing cover being removed and parts being shown in section) of the apparatus, with the shifting sleeve clutch member in the third neutral position. Fig. 2 is a detail longitudinal section and part elevation of the driving and driven shaft, showing the shiftable clutch sleeve member in engagement with the clutch lugs of the "intermediate" gear sleeves. Fig. 3 is a view similar to Fig. 2, showing the shiftable clutch sleeve member with its lugs in engagement with the lugs of the reverse gear member. Fig. 4 is a cross section on the line 4—4 of Fig. 3. Fig. 5 is a perspective view of the apparatus, the cover of the housing being removed. Fig. 6 is a detail perspective view of the clutch sleeve. Fig. 7 is a detail perspective view, parts being broken away, of a portion of the driving and driven shafts. Fig. 8 is a detail view showing how the counter shaft driving gear is disconnected when the driving and driven shafts are directly connected together for high speed purposes. Fig. 9 is a detail section and part elevation of a modification of the invention. Fig. 10 is a cross section on the line 10—10 of Fig. 9. Fig. 11 is a cross section on the line 11—11 of Fig. 9. Fig. 12 is a detail perspective view of the reverse gear sleeve showing the clutch lugs or fingers. Fig. 13 is a similar view, a part being broken away, showing the low speed gear sleeve lugs. Fig. 14 is a detail perspective view of the shifting key member that corresponds in function to the shiftable clutch sleeve of Fig. 6.

In the drawings in which like numerals and letters of reference designate like parts in all the figures, 1 is the housing, in bearings 2 and 3 of which the driving shaft 4 and driven shaft 5 are mounted. The driven shaft 5 has a round or cylindrical portion 6 and a squared portion 7, and terminates in a reduced cylindrical portion 8 that enters the bearing socket 9 of the driving shaft 4.

10 is the driving gear that is keyed or otherwise secured to the shaft 4 to continuously turn with it, and the gear 10 has a clutch face 11 to coöperate with the clutch face 12 of the clutch end 14, of the shiftable clutch sleeve 13. The clutch end 14 has a squared bore 19 to fit the squared portion 7 of the driven shaft 5, and it is shiftable along such squared portion by a rod 16 whose yoke fingers 15 enter the groove of the clutching end 14, and the rod 16 passes through the housing bearing 17 and may be actuated by the operator in any desired way. The shiftable clutch sleeve member 13 has lugs 18 at the end opposite the clutch end 14, the lugs 18 having their front and rear edges well rounded to coöperate with correspondingly formed lugs 23, 27 and 29, hereinafter again referred to.

20 is the intermediate speed gear sleeve which runs loosely on the cylindrical portion 6 of the shaft 5, and has an enlargement 22 at one end that carries the lugs 23. At its other end, the sleeve 20 carries the intermediate driven shaft gear 21. On the sleeve 20 is a second sleeve 25 which also has an enlargement 26 that carries the lugs 27, the lugs 27 being spaced from the lugs 23 a distance greater than the length of the lugs 18 to form a neutral space 62. On the sleeve 25 is a third gear 30 which has a clutch face 29 and meshes with the reversing pinion 47 on the stub shaft 48. The lugs 27 are spaced from the lugs 29 a distance greater than the length of the lug 18 to afford a neutral space 63 for a purpose later more fully understood.

28 is the low speed gear which is keyed or otherwise secured at 24 to the sleeve 25.

The gears 21 and 28 respectively mesh with gears 32 and 33 on a counter shaft 31 which is mounted in bearings 46 in the frame 1, while the pinion 47 meshes with a gear 34 that is also mounted on the counter shaft 31. The driving shaft gear 10 meshes with a gear 35 that is loosely mounted on the counter shaft 31, and has a clutch face 36 that coöperates with the clutch face 37 of the shifting member 38, which is keyed at 39 to the shaft 31. A spring 41 engages a collar 40 on the shaft 31 and continuously tends to press the clutch member 38 into engagement with the clutch face of the gear 35. Pivoted at 43, on a bracket 42, is a shifting lever 44, one end of which is adapted to be engaged by the clutch end 14 of the shiftable clutch sleeve 13 (see Fig. 1), and the other end of which carries idler rollers 45 that enter the groove of the shiftable clutch member 38, whereby when the member 13 is moved to bring the clutch faces 11 and 12 into mesh, the clutch faces 36 and 37 will be disengaged to permit the gear 35 to run idle on the shaft 31.

In the modified form shown in Fig. 9, the arrangement is somewhat reversed. The reverse gear 30 is mounted on a sleeve 59, which in this case is the inner sleeve instead of the outer one, the driving shaft 5 is provided with a key slot 50, the low speed gear 28 is mounted on the intermediate sleeve 57, and the intermediate gear 21 is mounted on the outer sleeve 55. The sleeve 55 has internal lugs 56, while the sleeve 57 has internal lugs 58, and the sleeve 59 has lugs 60 to be engaged by the key 51 successively, the lugs 56, 58 and 60 being spaced apart a distance greater than the length of the key 51, whereby to provide neutral spaces 62 and 63, there being a third neutral space 61 when the key 51 is out of the sleeve 55 entirely. The key 51 is connected by an arm 52 to the shiftable clutch member 53 whose clutch face 54 is adapted to coöperate with the clutch face 11 of the driving gear 10. In this form, the slot 50 takes place of the squared portion 7 of the shaft 5 in Figs. 1 and 2.

Operation: In the normal position of the parts, the sleeve 13 is located as shown in dotted lines in Fig. 1, with its lugs 18 located in the first neutral space 63. When in this position, the gears 21, 28 and 30 run idle on the shaft 5 and the sleeves of one another while the shaft 31 is driven from the driving shaft 4 through the medium of the gears 10 and 35, it being understood that the clutch 38 is in engagement with the gear 35. Now, if it is desired to go into low speed, the operator pulls on the rod 16 in any desired way to bring the lugs 18 of the shiftable clutch sleeve 13 into the path of movement of the lugs 27 of the low speed gear sleeve, it being understood that the lugs 18 pass between adjacent ones of the lugs 27 thus coupling the low speed gear sleeve 26 to the shiftable clutch member 13 and through it to the shaft 5, causing the low speed gear 28 and shaft 5 to turn together as one under the influence of the power transmitted from the driving shaft 4 via the gears 10 and 35, counter shaft 31 and gear 33. When it is desired to go into "intermediate" speed, the sleeve 13 is pulled farther toward the right in Fig. 1 until its lugs 18 pass into the neutral space 62 and from it into a position between the lugs 23 as shown in Fig. 2, whereupon the intermediate gear 21 will be coupled to turn with the shaft 5 and be driven through the medium of the gears 32, counter shaft 31, gears 35 and 10 from the driving shaft 4. The next movement of the shiftable clutch sleeve 13 from the position shown in section in Fig. 2 to the position shown in elevation in Fig. 1 brings the parts into the third neutral position, and a further movement of the sleeve 13 from the position shown in Fig. 1 to the position shown in Fig. 8 will bring the clutch members 11 and 12 into mesh and disconnect the clutch members 36 and 37. At this time the shafts 4 and 5 are directly coupled together through the medium of the clutch faces 11 and 12. The counter shaft 31 and gears 32, 33, 34, together with the gears 21, 28, 30, and pinion 47, remain idle due to the fact that the gear 35 now runs loose on the shaft 31 and hence the driving shaft power is practically all transmitted to the driven shaft without waste through the operation of idle parts.

The operation of the form shown in Fig. 9 et seq. is substantially the same, and a description thereof is thought to be unnecessary.

I am aware that attempts have heretofore been made to eliminate the disadvantages of selective gear transmissions in which the gears themselves are shiftable bodily into and out of mesh, but the great difficulty that has arisen in attempting to solve this problem is to provide a means whereby the selective gearing can be brought into action without noise and without danger of breakage of parts. By my construction, it will be noted, the lugs 18, 23, 27 and 29 can be made heavy and of durable construction, with their front and back edges well rounded so that the lugs 18 will easily and quickly enter between adjacent lugs 23, 27 or 29 without "racking".

From the foregoing description, taken in connection with the accompanying drawings, it is thought the complete construction, operations and advantages of the invention will be apparent to those skilled in the art.

What I claim is:—

In a transmission mechanism, a driving shaft, the end of said driving shaft having a socket, a driven shaft arranged in longitudinal alinement with said driving shaft and having a reduced portion to rotatably fit into said socket, a counter shaft, a support including bearings for said shafts, a gear having a clutch face and secured to turn with said driving shaft, said driven shaft having a squared portion and a portion of circular cross section, a shiftable sleeve mounted on said driven shaft and including a squared bearing to fit the squared portion of said driven shaft, said shiftable sleeve having a clutch face to engage the clutch face of said driving shaft gear when shifted into connection with the same, means for shifting said shiftable sleeve, a plurality of gears on said counter-shaft to turn with the same, a plurality of sleeves mounted on that portion of the driven shaft which is of circular cross section, said last named sleeves each having projecting ends, radial lugs on said projecting ends, gears carried by said sleeves to mesh with the counter-shaft gears, the radial lugs of one sleeve being spaced from the radial lugs of an adjacent sleeve a distance greater than the length of the lugs, said shiftable sleeve having lugs to coöperate with said aforementioned lugs and adapted to be successively brought into engagement with the aforementioned lugs, a gear loosely mounted on said counter-shaft to mesh with said driving shaft gear, a spring pressed clutch member on said counter-shaft to continuously tend to engage said loose counter-shaft gear, said loose counter-shaft gear having a clutch face, a lever rockably mounted between said counter-shaft and said driving and driven shafts and continuously engaging said spring pressed clutch member, said shiftable sleeve being adapted to engage said lever to move said spring pressed clutch member out of its clutching position when said shiftable sleeve clutch face is engaged with said driving shaft gear clutch face, all being arranged substantially as shown and for purposes described.

WILLIAM A. SO RELLE.

Witnesses:
C. E. DUKE,
HOMER GLASCOE.